(12) United States Patent
Ristau et al.

(10) Patent No.: US 9,677,673 B2
(45) Date of Patent: Jun. 13, 2017

(54) BALANCED DOUBLE SEATED GLOBE VALVE WITH FLEXIBLE PLUB

(71) Applicant: SPX CORPORATION, Charlotte, NC (US)

(72) Inventors: David C. Ristau, Erie, PA (US); Nathan T. Hansen, Waterford, PA (US)

(73) Assignee: SPX Flow, Inc., Charlotte, NC (US)

( * ) Notice: Subject to any disclaimer, the term of this patent is extended or adjusted under 35 U.S.C. 154(b) by 48 days.

(21) Appl. No.: 14/509,671

(22) Filed: Oct. 8, 2014

(65) Prior Publication Data

US 2016/0102766 A1 Apr. 14, 2016

(51) Int. Cl.
| | |
|---|---|
| F16K 39/00 | (2006.01) |
| F16K 3/24 | (2006.01) |
| F16K 47/08 | (2006.01) |
| F16K 47/00 | (2006.01) |
| F16K 1/00 | (2006.01) |
| F16K 15/00 | (2006.01) |
| F16L 55/02 | (2006.01) |
| F16K 1/42 | (2006.01) |
| F16K 1/44 | (2006.01) |
| F16K 27/02 | (2006.01) |
| F16K 31/50 | (2006.01) |
| F16K 25/02 | (2006.01) |
| F16K 1/36 | (2006.01) |

(52) U.S. Cl.
CPC ............... *F16K 1/42* (2013.01); *F16K 1/44* (2013.01); *F16K 25/02* (2013.01); *F16K 27/02* (2013.01); *F16K 31/508* (2013.01); *F16K 47/08* (2013.01); *F16K 1/36* (2013.01); *Y10T 137/86759* (2015.04); *Y10T 137/86928* (2015.04)

(58) Field of Classification Search
CPC ... F16K 1/42; F16K 1/44; F16K 27/02; F16K 31/508; F16K 1/36; Y10T 137/86759; Y10T 137/86928
USPC .............................. 251/282; 137/625.33, 628
See application file for complete search history.

(56) References Cited

U.S. PATENT DOCUMENTS

| | | | |
|---|---|---|---|
| 4,688,601 A | 8/1987 | Astill | |
| 6,102,366 A * | 8/2000 | Perez C. | ................... F16K 7/20 251/175 |
| 6,305,665 B1 | 10/2001 | Coura et al. | |
| 6,655,409 B1 | 12/2003 | Steenburgh et al. | |
| 6,807,985 B2 | 10/2004 | Stares et al. | |

(Continued)

FOREIGN PATENT DOCUMENTS

GB 190927257 A 0/1910

OTHER PUBLICATIONS

International Search Report mailed Jan. 8, 2016 for PCT/US15/54649; filed Oct. 8, 2015.

*Primary Examiner* — R. K. Arundale
*Assistant Examiner* — Kelsey Rohman
(74) *Attorney, Agent, or Firm* — Baker and Hostetler LLP

(57) ABSTRACT

A valve plug includes a cylinder, a first plug seat, a second plug seat, and a convoluted portion. The cylinder has a first and second end. The first plug seat is disposed at the first end. The second plug seat is disposed proximal to the second end. The convoluted portion is disposed between the first seat and the second seat. The convoluted portion provides flexibility for the cylinder to flex between the first plug seat and the second plug seat.

10 Claims, 3 Drawing Sheets

(56) References Cited

U.S. PATENT DOCUMENTS

2013/0256572 A1* 10/2013 Lovell .................... F16K 47/08
251/118

* cited by examiner

BALANCED DOUBLE SEATED GLOBE VALVE WITH FLEXIBLE PLUB

FIELD OF THE INVENTION

The present invention generally relates to a valve. More particularly, the present invention pertains to a globe valve.

BACKGROUND OF THE INVENTION

It is generally well known that valves are important devices for the regulation of the flow of fluids in pipes or other such conduits. As known to those skilled in the art, a valve regulates the rate of fluid flow as the position of the valve plug within the valve is changed by an actuator. Two important features of a valve, such as a globe valve, are that it is generally desirous to be able to fully stop the flow fluid at the closed position and be capable of withstanding the temperatures and chemical influences of the fluid flowing therethrough. In order to properly stop the flow of fluid, it is advantageous for the mating surfaces within the valve to engage with a relatively high degree of precision. Even with this relatively high degree of precision, valves typically include elastomeric seals such as, washers, O-rings or the like to ensure a fluid-tight seal when the valve is positioned in a closed configuration. Typical globe valves are used in numerous applications ranging from simple level control to boiler feed water systems, superheated bypass applications, control of radioactive fluids, caustic or acidic fluids, and the like. Unfortunately, elastomeric materials are not capable of withstanding some of these relatively extreme conditions. In addition, large globe valves such as those having a flow control orifice or port greater than 6-inches in diameter and are known to suffer from seal failures.

Unfortunately, it is difficult to provide a seal that functions across a range of pressures and temperatures, that is compatible with a variety of fluids, that allows the valve to be opened and closed with minimal effort, and that is sufficiently wear resistant to withstand repeated opening and closing operations. While these issues are historically well known, conventional valves still suffer from one or more of these disadvantages.

Accordingly, it is desirable to provide a valve that overcomes the disadvantages described herein at least to some extent.

SUMMARY OF THE INVENTION

The foregoing needs are met, to a great extent, by the present invention, wherein in one respect valve is provided that in some embodiments overcomes the disadvantages described herein at least to some extent.

An embodiment of the present invention pertains to a valve plug. The valve plug includes a cylinder, a first plug seat, a second plug seat, and a convoluted portion. The cylinder has a first and second end. The first plug seat is disposed at the first end. The second plug seat is disposed proximal to the second end. The convoluted portion is disposed between the first seat and the second seat. The convoluted portion provides flexibility for the cylinder to flex between the first plug seat and the second plug seat.

Another embodiment of the present invention pertains to a trim for a globe valve. The trim includes a cage and a valve plug. The cage has a first cage seat, an opening, and a second cage seat. The first cage seat is disposed proximal to a first end of the cage. The opening is disposed above the first cage seat. The second cage seat is disposed above the opening. The valve plug includes a cylinder, a first plug seat, a second plug seat, and a convoluted portion. The cylinder has a first and second end. The first plug seat is disposed at the first end. The first plug seat is configured to mate with the first cage seat. The second plug seat is disposed proximal to the second end. The second plug seat is configured to mate with the second cage seat. The convoluted portion is disposed between the first seat and the second seat. The convoluted portion provides flexibility for the cylinder to flex between the first plug seat and the second plug seat.

Yet another embodiment of the present invention relates to a globe valve. The globe valve includes a body, a cage, and a valve plug. The cage is disposed in the body and has a first cage seat, an opening, and a second cage seat. The first cage seat is disposed proximal to a first end of the cage. The opening is disposed above the first cage seat. The second cage seat is disposed above the opening. The valve plug includes a cylinder, a first plug seat, a second plug seat, and a convoluted portion. The cylinder has a first and second end. The first plug seat is disposed at the first end. The first plug seat is configured to mate with the first cage seat. The second plug seat is disposed proximal to the second end. The second plug seat is configured to mate with the second cage seat. The convoluted portion is disposed between the first seat and the second seat. The convoluted portion provides flexibility for the cylinder to flex between the first plug seat and the second plug seat.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The present invention provides, in some embodiments, a flexible plug for use in balanced, double-seated globe valve trim and a globe valve with flexible plug. The globe valve is configured to provide control over the flow of fluid therethrough across a relatively wide range of pressures, temperatures, and chemical activity of the fluid. In a particular embodiment, these properties are instilled in the globe valve by virtue of a flexible metal plug that is entirely made from metal and/or includes no elastomeric or polymeric components. The globe valve is configured to provide a fluid-tight seal when positioned in the closed conformation as a result of a double seat with a flexible portion disposed therebetween. In addition to the flexible, all-metal construction, embodiments include some or all of the following features: Pressure balancing for reduced actuator thrust; Exceptional seat leakage tightness (Class V); Capable of continuous high temperature operation; Flexible region of plug capable of infinite cycle life; Employs standard differential angle seats; Available for full range of globe valve trim sizes; Capable of flow under or flow over the web; Simple design with no moving parts; and/or Manufactured with ordinary machining tolerances.

Figure 1:
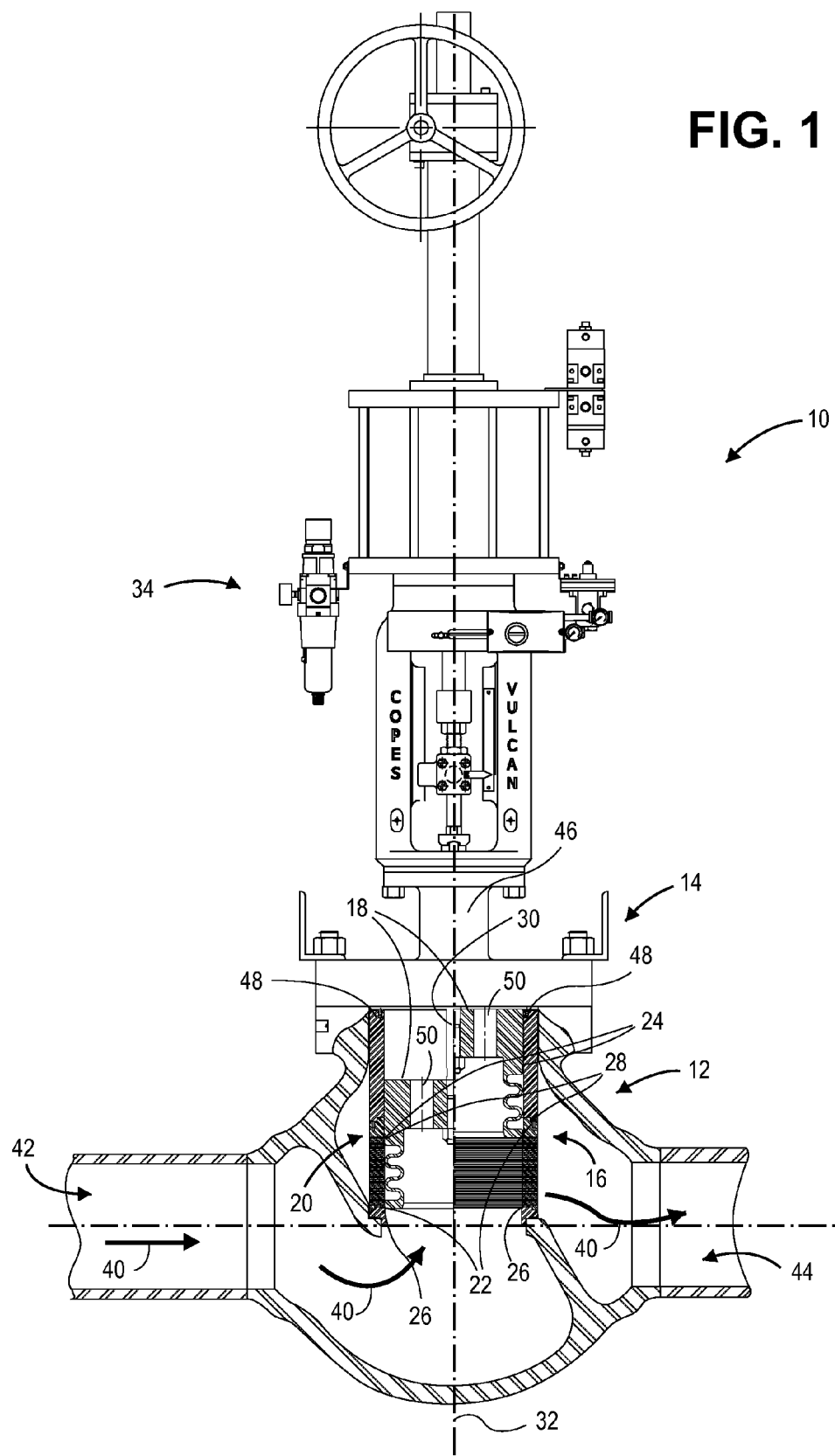
FIG. 1 is a cross-sectional side view of a globe valve according to an embodiment of the invention.

Embodiments of the invention will now be described with reference to the drawing figures, in which like reference numerals refer to like parts throughout. Referring now to FIG. 1, a balanced, cage style globe valve 10 is illustrated. The globe valve 10 is generally comprised of a body 12, a bonnet 14, and trim 16. The trim 16 contains the internal components of the globe valve 10 that modulate or control fluid flow through the globe valve 10 and includes a flexible plug 18 and a cage 20. The flexible plug 18 includes a first plug seat 22 and a second plug seat 24. The cage 20 includes a first cage seat 26 and a second cage seat 28. Fluid flow through the globe valve 10 is controlled by linear motion of a stem 30 urging the flexible plug 18 along a central longitudinal axis 32. The stem, in turn, is urged to translate along the central longitudinal axis 32 via the action of an actuator assembly 34. The actuator assembly 34 may include any suitable conventional actuator assembly.

The first plug seat 22 and the second plug seat 24 respectively mate with the first cage seat 26 and the second cage seat 28 to provide areas of contact in the cage 20 for the flexible plug 18 to create valve shut-off in order to inhibit fluid flow through globe valve 10. In various examples, the globe valve 10 may be in a flow-up or flow-down configuration. In a particular example, the globe valve 10 illustrated in FIG. 1 is shown in a flow-up configuration. The fluid stream flows up through the trim 16 as indicated by a set of flow arrows 40 from an inlet 42, through the trim 24, and out an outlet 44. The force required to move the flexible plug 18 is supplied by an actuator assembly 34 that is directly coupled to the body 12 through the bonnet 14. The actuation force from the actuator assembly 34 is transferred to the flexible plug 18 through the stem 30 that is rigidly attached to the actuator assembly 34 and the flexible plug 18. The cage 20 is configured to provide a guide for the flexible plug 18 to slide within. In addition, as further described herein, the cage 20 includes the first cage seat 26 and the second cage seat 28. The cage 20 is disposed within the body 12 and held in place by a compressive force exerted by the attached bonnet 14.

The bonnet 14 is configured to retain pressure of the fluid within the body 12. The bonnet 14 not only provides a mount for the actuator assembly 34 to the body 12, compressively retains the cage 20, but also houses a packing 46 to create a fluid seal around the stem 30. The bonnet 14 may include any suitable type of bonnet. In a particular example, the bonnet 14 is the bolted-flange type depicted in FIG. 1 showing a bonnet 14 with a single integral flange or shoulder 48.

The balanced-plug globe valve 10 shown in FIG. 1 allows upstream fluid, and therefore upstream fluid pressure, to pass through a passageway 50 disposed in the flexible plug 18 and thus balance a pressure load on both a top and bottom sides of the flexible plug 18. This pressure balance nullifies most of the static unbalance force on the flexible plug 18. The reduced unbalance force permits operation of the globe valve 10 with smaller actuators than those necessary for conventional unbalanced, valve bodies.

Figure 2:
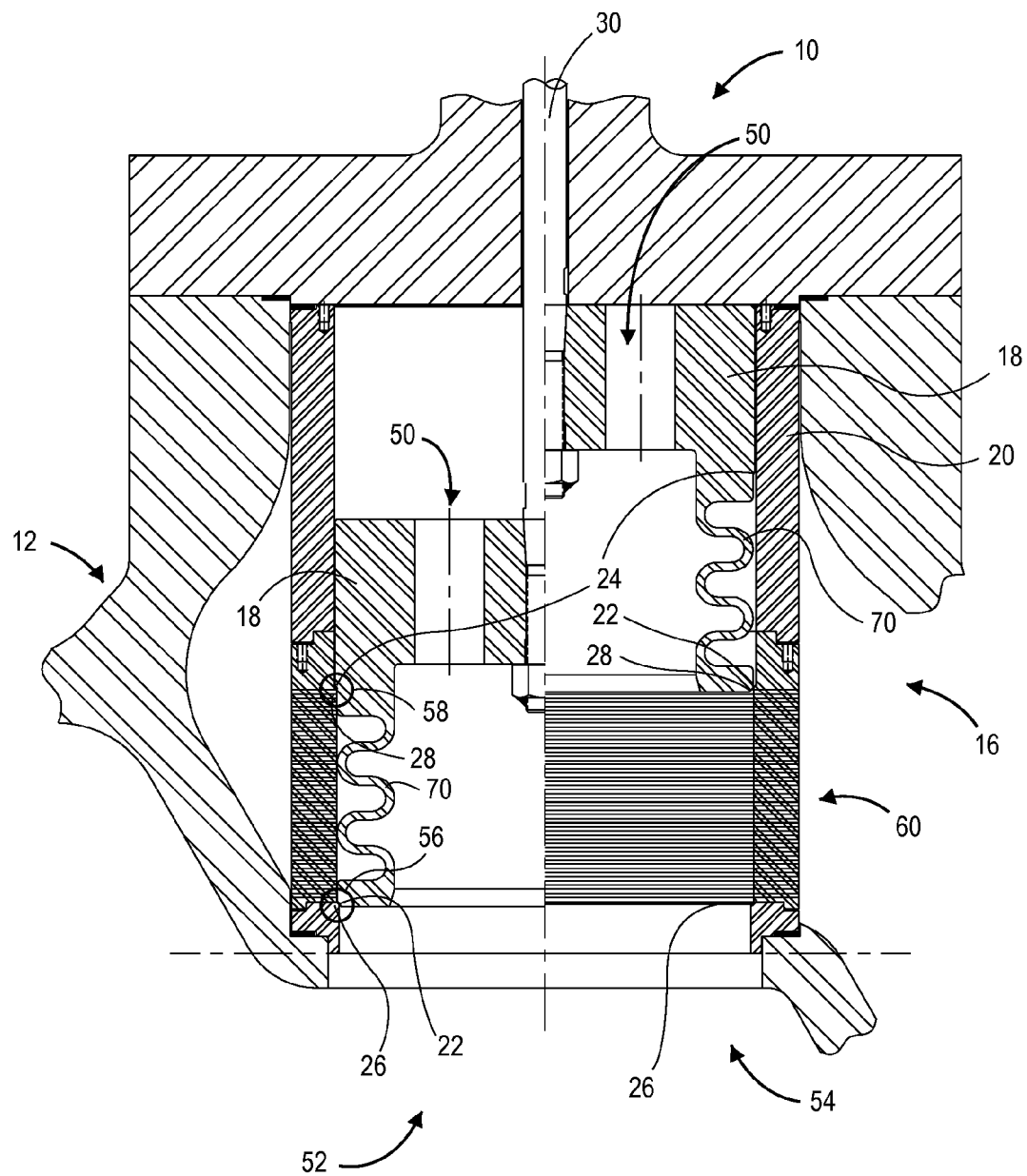
FIG. 2 is a split cross sectional view of a portion of the globe valve with one half of the view being in a closed conformation and the other half being in an open conformation according to FIG. 1.

The globe valve 10 shown in FIG. 1 is illustrated in both an open and closed conformation. That is, the cross sectional view is split along the central longitudinal axis 32 with a view 52 to the left being in the closed conformation and a view 54 to the right being in the open conformation. The views 52 and 54 are shown in greater detail in FIG. 2. In FIG. 2, the view 52 shows a first seal 56, a second seal 58 and an opening 60 disposed between the first and second seals 56 and 58. In this manner, the opening 60 may be completely sealed off in response to the first seal 56 and second seal 58 being sealed. In response to the seal 56 and seal 58 being unsealed, the opening 60 is configured to allow the fluid to flow therethrough. In this regard, the opening 60 may include any suitable passage or passages configured to allow fluid to flow therethrough. In a particular example, the opening 60 may include a screen or mesh-like area at a portion of the cage 20. In another example, the opening 60 may include one or more holes bored through or formed in the cage 20. In yet other examples, the opening 60 may include slots or other such conduits for the flow of the fluid through the globe valve 10.

Disposed between the first plug seat 22 and the second plug seat 24 is a spring or convolution 70. The convolution 70 is configured to provide flexibility in the flexible plug 18 between the first plug seat 22 and the second plug seat 24. As shown, the convolution 70 includes a serpentine wall with material properties that allow the convolution 70 to flex when compressed and then return to a nominal shape when not under a load. This flexibility allows the first seal 56 and the second seal 58 to be formed while accommodating minor irregularities. This action is similar to the role an elastomeric seal plays in a conventional valve. However, in the globe valve 10, the use of the flexible plug 18 provides for this ability without the disadvantages of elastomeric seals. For example, the convolution 70 may be as heat, radiation, and/or chemical tolerant as the base metal used in the flexible plug 18. In another example, the convolution 70 may be able to withstand substantially more open/close cycles than an elastomeric seal. These and other advantages may be provided by the convolution 70.

Figure 3:
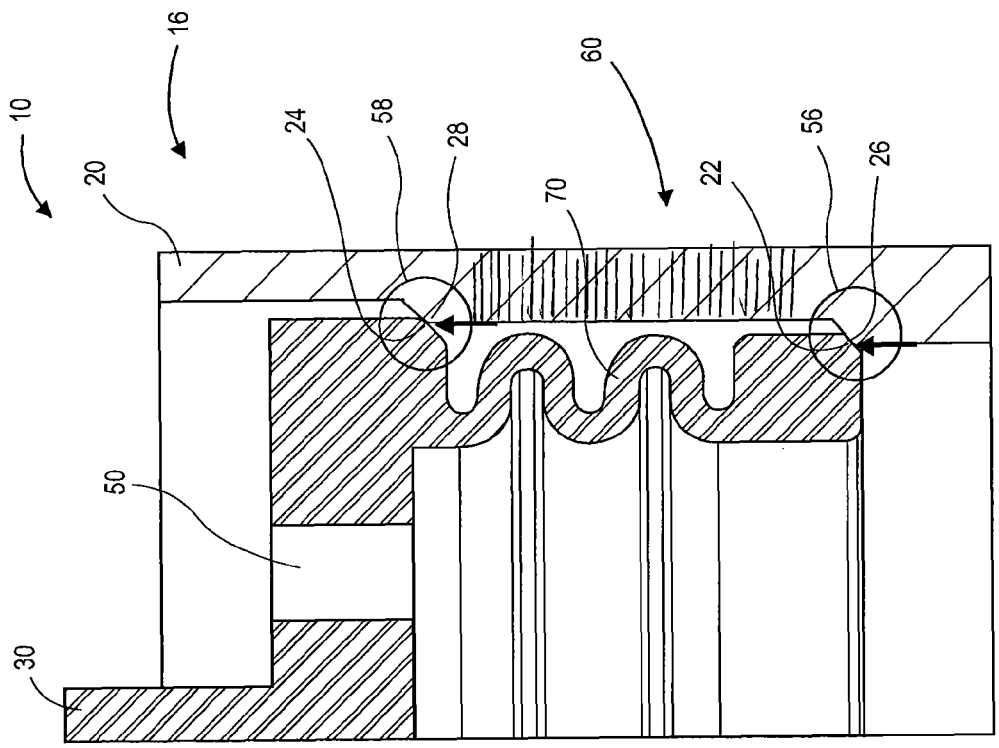
FIG. 3 is a detailed cross-sectional view of the globe valve in a partial closed conformation according to FIG. 1.

FIG. 3 is a detailed cross-sectional view of the globe valve 10 in a partial closed conformation according to FIG. 1. As shown in FIG. 3, in this partial closed or initial conformation, the first plug seat 22 is brought in contact with the first cage seat 26 to establish the first seal 56. The convolution 70 includes a spring rate (k) in newton/meters (N/m). Factors that may influence the spring rate of the convolution 70 include the thickness of the materials selected and material properties of those materials including the temperature profile the materials have been subjected to.

At a stem force from about 0 newtons until the spring rate is overcome, a gap 72 is present. The spring rate and gap 72 determine the amount of compressive force closing the first seal 56. That is, once a sufficient load is placed on the stem 30 (stem force) to contact the second plug seat with the second cage seat 28, any additional stem force is essentially not transferred to the first seal 56 but instead, further compresses the second seal 58. By varying these factors, the spring rate may be configured to provide sufficient force upon the first plug seat 22 to seal the first seal 56. It is an advantage that the compressive closing force on the first seal 56 can be controlled by modulating the spring rate and the size of the gap 72 at a stem force of about 0 newtons. This relationship is described in the following equation:

$$F_1 = kx \qquad \text{eq. 1}$$

Where $F_1$ is the compressive force on the first seal 56, k is the spring rate (in kilograms (kg)/meter (m)) of the convolution 70, and x is the length (m) of the gap 72 at the point where the first plug seat 22 and first cage seat 26 make contact and the stem force is 0 newtons. In this manner, a sufficient force to seal the first seal 56 may be applied while minimizing the possibility of over-compressing the first seal 56. The amount of force used to seal the first seal 56 depends upon a variety of factors such as, for example, a contact area of the first seal 56, surface finishing and material properties at the contact area, machining tolerances, expected flow rate, pressure, fluid, etc. in the globe valve 10, empirical data, and the like.

At this partial close position, in either a flow over or flow under conformation of the flow in the globe valve 10, the fluid pressures are balanced. For example, in a flow over conformation, fluid entering from below the cage 20 may flow through the passageway 50 such that the pressures on either side of the flexible plug 18 are balanced. In a flow under conformation, the fluid may flow through the gap 72 to flow above the flexible plug 18 and then flow through the passageway 50 to again balance the pressures on the flexible plug 18. In conventional, single seat valves, actuator loads required to close the valve can become excessive—particularly at larger trim sizes and/or for higher pressure drops across the trim.

Figure 4:
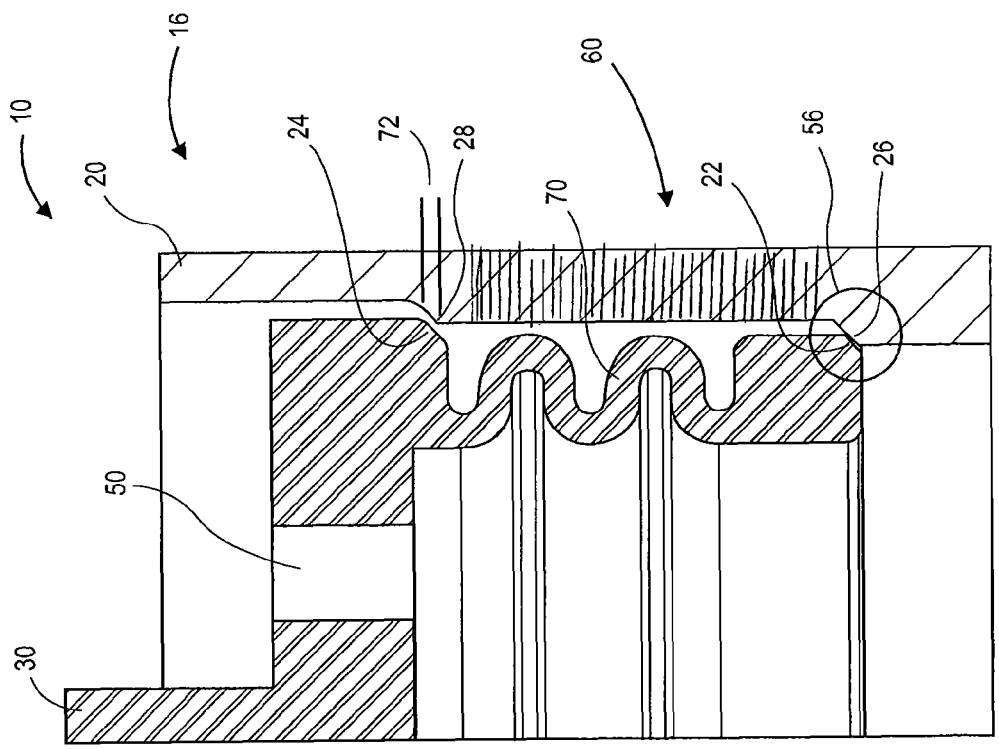
FIG. 4 is a detailed cross-sectional view of the globe valve in a fully closed conformation according to FIG. 1.

FIG. 4 is a detailed cross-sectional view of the globe valve 10 in a fully closed conformation according to FIG. 1. As shown in FIG. 4, in this closed conformation, the second plug seat 24 is brought in contact with the second cage seat 28 to establish the second seal 58. Once this initial contact is made, further compression of the second seal 58 acts to seal the second seal 58.

In order to close the second seal 58, a second force ($F_2$) in addition to $F_1$ applied to the stem 30. The amount of force used to seal the second seal 58 depends upon a variety of factors such as, for example, a contact area of the second seal 58, surface finishing and material properties at the contact area, machining tolerances, expected flow rate, pressure, fluid, etc. in the globe valve 10, empirical data, and the like. The amount of force used to seal the second seal 58 is described in the following equation:

$$F_{seal} = kx + F_2 \qquad \text{eq. 2}$$

Where $F_{seal}$ is the force exerted by the actuator assembly 34 (shown in FIG. 1) and translated via the stem 30 to the flexible plug 18, k is the spring rate (kg/m) of the convolution 70, x is the length (m) of the gap 72 at the point where the first plug seat 22 and first cage seat 26 make contact and the stem force is 0 newtons, and F2 is the amount of force configured to seal the second seal 58. In this manner, a sufficient force to seal the second seal 58 may be applied while minimizing the possibility of over-compressing the second seal 58.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A valve plug comprising:
   a cylinder having a first and second end;
   a first plug seat disposed at the first end;
   a surface covering the second end;
   a passageway disposed through the surface, the passageway providing a flow path for fluid to flow between above and below the valve plug to balance a fluid pressure;
   a second plug seat disposed proximal to the second end; and
   a convoluted portion disposed between the first seat and the second seat, the convoluted portion providing flexibility for the cylinder to flex between the first plug seat and the second plug seat, wherein the valve plug is a unitary metal construction.

2. The valve plug according to claim 1, further comprising:
   a stem extending from the surface and configured to transmit force from an actuator assembly.

3. A trim for a globe valve, the trim comprising:
   a cage having:
      a first cage seat disposed proximal to a first end of the cage;
      an opening disposed above the first cage seat, the opening being defined by a cylindrical metal mesh; and
      a second cage seat disposed above the opening; and
   a valve plug having:
      a cylinder having a first and second end;
      a first plug seat disposed at the first end;
      a surface covering the second end;
      a passageway disposed through the surface, the passageway providing a flow path for fluid to flow between above and below the valve plug to balance a fluid pressure;
      a second plug seat disposed proximal to the second end; and
      a convoluted portion disposed between the first seat and the second seat, the convoluted portion providing flexibility for the cylinder to flex between the first plug seat and the second plug seat, wherein the valve plug is a unitary metal construction.

4. The trim according to claim 3, further comprising:
   a stem extending from the surface and configured to transmit force from an actuator assembly.

5. A globe valve comprising:
   a body;
   a cage disposed in the body, the cage having:
      a first cage seat disposed proximal to a first end of the cage;

an opening disposed above the first cage seat, the opening being defined by a cylindrical metal mesh; and
a second cage seat disposed above the opening; and
a valve plug having:
a cylinder having a first and second end;
a first plug seat disposed at the first end, the first plug seat being configured to mate with the first cage seat;
a surface covering the second end;
a passageway disposed through the surface, the passageway providing a flow path for fluid to flow between above and below the valve plug to balance a fluid pressure;
a second plug seat disposed proximal to the second end; and
a convoluted portion disposed between the first seat and the second seat, the convoluted portion providing flexibility for the cylinder to flex between the first plug seat and the second plug seat, wherein the valve plug is a unitary metal construction.

6. The globe valve according to claim 5, further comprising:
a stem extending from the surface.

7. The globe valve according to claim 6, further comprising:
an actuator assembly configured to urge the stem into and out of the body.

8. The globe valve according to claim 5, wherein in response to the valve plug being urged into the cage, the first plug seat is configured to contact the first cage seat to form a first seal, at the time the first seal is formed, a gap is present between the second plug seat and the second cage seat.

9. The globe valve according the claim 8, wherein a second seal is formed between the second plug seat and the second cage seat in response to the valve plug being urged sufficiently to overcome a spring rate of the convoluted portion.

10. The globe valve according to claim 9, wherein in response to the second seal being formed, additional force urging the valve plug down is not translated to the first seal.

* * * * *